May 28, 1968  G. O. COMEAU  3,384,913

SOLE EDGE TRIMMER

Filed March 2, 1966  4 Sheets-Sheet 1

INVENTOR:
GEORGE O. COMEAU,
BY
ATTORNEY

May 28, 1968 G. O. COMEAU 3,384,913
SOLE EDGE TRIMMER
Filed March 2, 1966 4 Sheets-Sheet 2
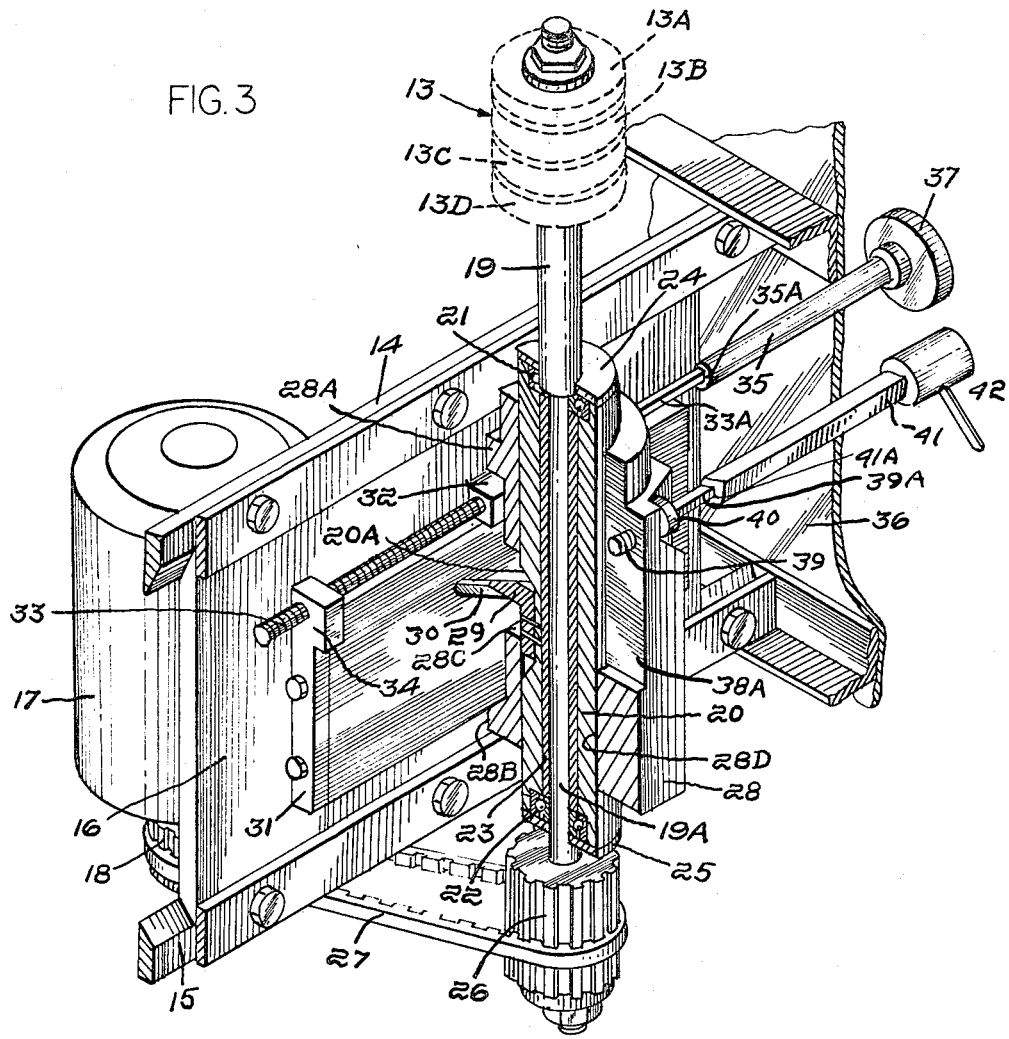
INVENTOR:
GEORGE O. COMEAU,
BY [signature]
ATTORNEY

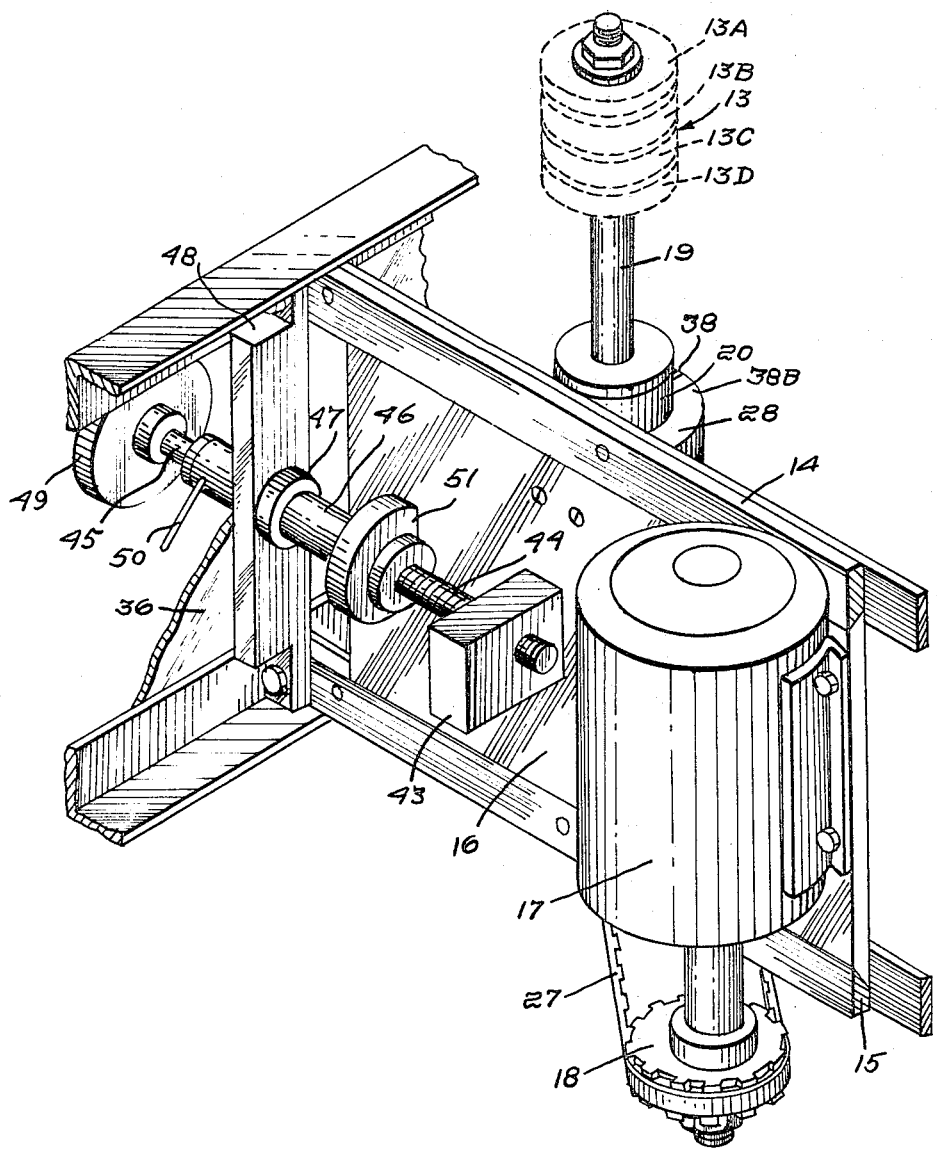

May 28, 1968  G. O. COMEAU  3,384,913
SOLE EDGE TRIMMER
Filed March 2, 1966  4 Sheets-Sheet 4
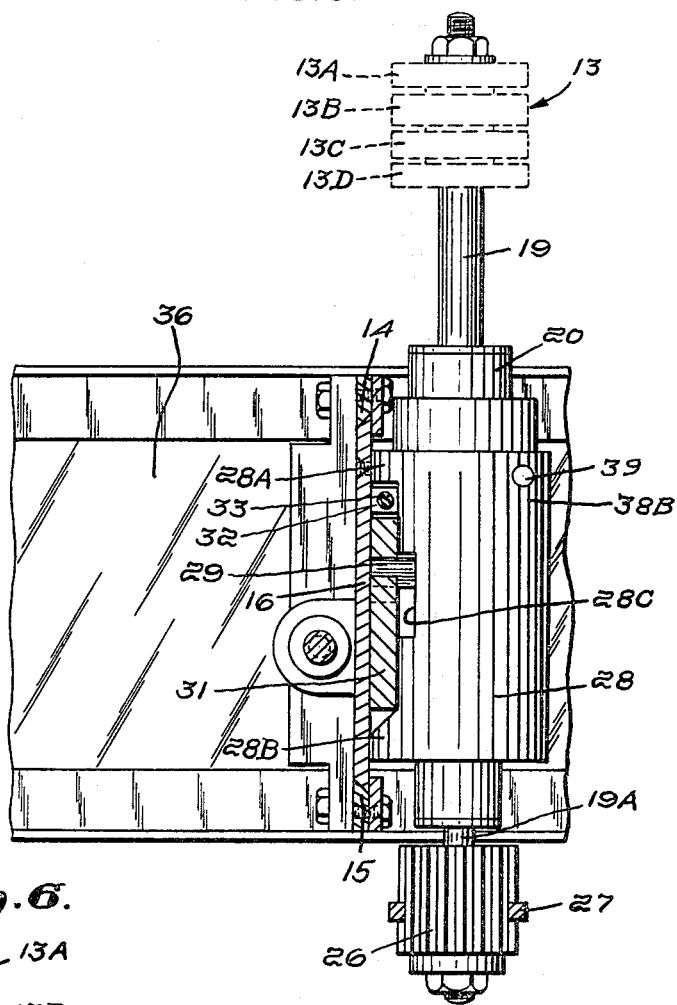
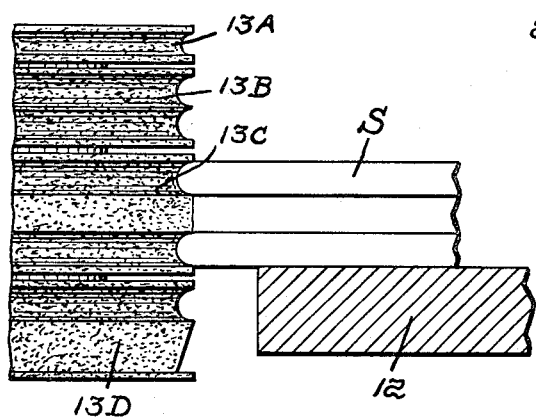
INVENTOR:
GEORGE O. COMEAU,
BY
ATTORNEY United States Patent Office 3,384,913
Patented May 28, 1968

3,384,913
SOLE EDGE TRIMMER
George O. Comeau, 6 Little River Road,
Haverhill, Mass. 01830
Filed Mar. 2, 1966, Ser. No. 531,296
13 Claims. (Cl. 12—87)

ABSTRACT OF THE DISCLOSURE

Sole edge trimmer with an edge trimming member extending upwardly through the sole supporting surface and with its drive below the surface together with means operable to move the trimming member vertically, the axial extent of the trimming member being greater than the thickness of the sole, and means to move the edge trimming member and its drive transversely as required by the diameter of the portion of the trimming member that is in use.

---

The present invention relates to sole edge trimmers of the type in which a sole is automatically turned on a flat supporting table with its edge continuously in contact with an edge trimming member.

A sole edge trimming member requires replacement whenever a different pattern or profile is to be formed on the edge of the sole. When the replacement member is of a different diameter than that previously used, its position must be adjusted transversely relative to the sole supporting surface to ensure that the edge trimmer functions properly. Replacements, whether for this or other reasons, represent an interruption in production, even if the replacement member is of the same diameter.

A principal objective of the invention is to eliminate the necessity of interrupting production when a different edge trimming effect is wanted, such effect being usually, but not necessarily, a different sole edge pattern or profile. In accordance with the invention, this objective is attained by providing an edge trimmer with its edge trimming member vertically adjustable and of such an axial extent that, by appropriate vertical adjustments, any selected annular portion may be brought into an operative position relative to a sole.

The edge trimming members may be stones, abrasives, or cutters and, as these are available in a wide range of diameters, another principal objective of the invention is to provide for the transverse adjustments of the shaft supporting them that becomes necessary on a change of from one diameter to another.

Yet another principal objective of the present invention is to provide a sole edge trimmer in which either or both the horizontal or the vertical adjustments of the edge trimming member may be effected quickly, easily, and accurately.

A further principal objective of the invention is to provide an edge trimmer in which the adjustments may be made without stopping the motor by which the edge trimming member is driven.

Another principal objective of the invention is to provide an edge trimmer in which the shaft for the edge trimming member is carried by a holder vertically slidable in a mount attached to a support below the sole-supporting surface. Means are provided to move the holder vertically relative to the support and, where transverse adjustments are wanted, means are also provided to move the support and holder as a unit transversely relative to the sole supporting surface.

Yet another principal objective of the invention is to provide an edge trimming member that consists of an axially alined assembly of elements.

In the accompanying drawings, there is shown an embodiment of the invention from which these and other of its objectives, novel features, and advantages will be readily apparent.

Figure 1:
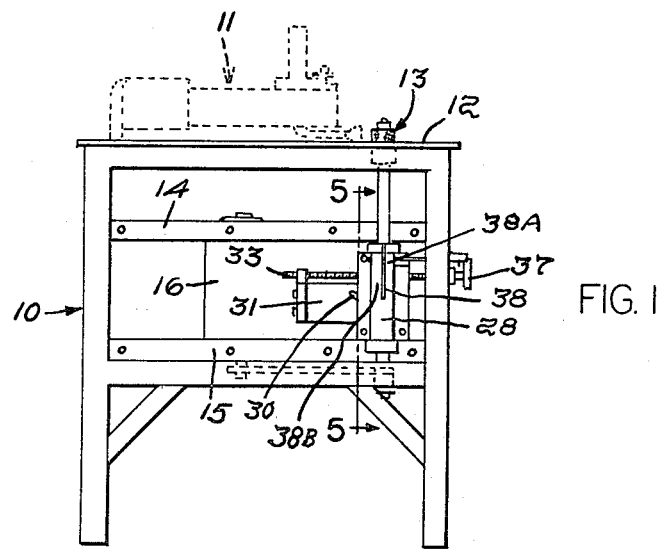
FIGURE 1 is a view of the edge trimmer as viewed from one side thereof.
Figure 2:
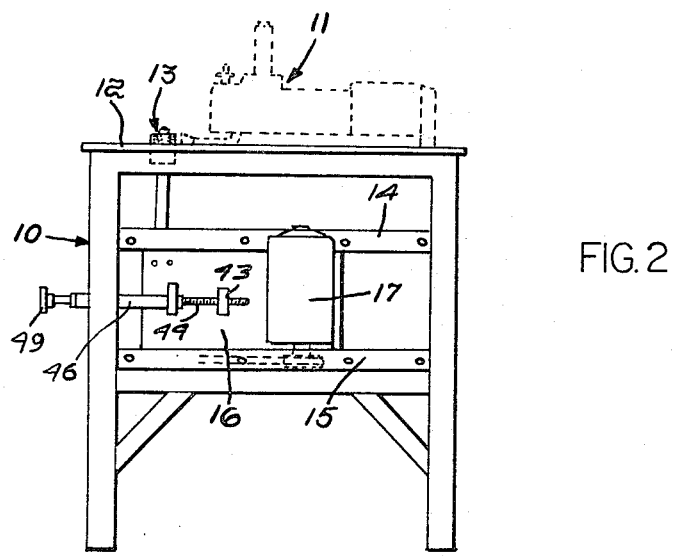
FIGURE 2 is a like view of the opposite side thereof.

FIGURE 3 is a fragmentary and partly sectioned perspective side view of the edge trimming member and the means supporting it for forward and rearward as well as vertical movements relative to the sole-supporting structure, FIGURE 4 is a like view taken from the other side thereof, FIGURE 5 is a section taken approximately along the indicated lines 5—5 of FIGURE 1, and FIGURE 6 is a fragmentary vertical elevation showing the edge trimming member consisting of a series of stones differing in profile.

The edge trimmer illustrated by the drawings includes a generally indicated table 10 provided with means, generally indicated at 11, by which a sole S, see FIGURE 6, supported on the table top 12 is turned completely about with its edge continuously in contact with an edge trimming member, generally indicated at 13. The sole turning means is not herein detailed, except for the edge trimming member 13 and the supporting, rotating, and adjusting means therefor, as the sole turning means may otherwise be of the type shown in United States Letter Patent No. 3,226,748.

A pair of vertically spaced and vertically alined slideways 14 and 15, supported by the framework of the table 10, extend forwardly and rearwardly under its top 12. A plate 16, whose opposite edges are slidably confined in the slideways 14 and 15, has a motor 17 secured to one side thereof with its driving pulley 18 positioned below the slideway 15.

The edge trimming member 13 extends upwardly through a hole in the table top 12 with its axis vertical with respect thereto and is shown, in FIGURE 6, as consisting of a plurality of trimming elements in the form of stones 13A, 13B, 13C, and 13D each differing in profile, clamped on the upper end of a vertically disposed shaft 19 located on the other side of hte plate 16. The shaft 19 is rotatably supported by a tubular holder 20, the shaft 19 having, for this purpose, and as may be seen in FIGURE 3, a lower portion 19A of reduced diameter extending through the holder 20 and supported by ball bearing units 21 and 22 at opposite ends of a spacer 23 fitting within the holder 20 and held in place by end caps 24 and 25. The lower end of the shaft portion 19A extends below the slideway 15 and is provided with a pulley 26 connected to the pulley 18 by a belt 27. It will be noted that the axial extent of the pulley 26 is sufficient to ensure the maintenance of the driving connection when the pulley moves vertically with the shaft 19.

A mount 28 has vertically spaced bosses 28A and 28B secured to the plate 16 and a port 28C intermediate the bosses 28A and 28B, the port 28C opening into the vertical bore 28D in which the holder 20 is slidable. The holder 20 has a recess 20A in which an arm 29 is anchored, the arm extending outwardly through the port 28C and into and slidably held by a slot 30 in a plate 31 slidably confined between the plate 16 and the mount 28 and supported by the boss 28B. The slot 30 is upwardly and rearwardly inclined so that rearward movement of the plate 31 relative to the plate 16 and to the mount 28 forces the holder 20, the shaft 19 and the edge trimming member 13 upwardly with forward movement of the plate 31 resulting in downward movement of these parts.

In order for such movements of the plate 31 to be effected, the plate 16 has a fixed nut 32, see FIGURE 3, through which a screw 33 is threaded, the screw 33 being also threaded through a nut member 34 bolted to the rear end of the plate 31. A stem 35 extends through the front wall 36 of the table and its exposed end is provided with a knob 37. The inner end of the stem 35 has a square socket 35A slidably receiving the square shank 33A of the screw 33.

The upper end of the mount 28 is vertically slotted as at 38 with the slot providing clamping portions 38A and 38B adapted to be drawn together to clamp the holder against vertical movement or released by a screw 39 provided with a clamping flange 40 backing the portion 38A and threaded into the portion 38B, the screw 39 including a square shank 39A. A stem 41 extends through the front wall 36 and an arm 42 is fixed on its outer end. The inner end of the stem 41 has a square socket 41 A slidably receiving the shank 40A.

The side of the plate 16 on which the motor 17 is located has a fixed nut 43 through which is threaded the threaded end 44 of a shaft 45 rotatable in a sleeve 46. The sleeve 46 extends through the front wall 36 and is rotatable within a collar 47 in a vertical bar 48 anchored to the slideways 14 and 15. The outer end of the shaft 46 is provided with a knob 49 while the outer end of the sleeve 46 is provided with an arm 50 to facilitate its being turned to rotate the cam 51 into and out of locking engagement with the plate 16.

From the foregoing, it will be apparent that the edge trimming member 13 may be adjusted forwardly and rearwardly, with the cam 51 in its unlocked position, by turning the knob 49 in the appropriate direction to a desired extent. With the cam 51 locked and the split end of the holder 28 released from clamping engagement with the holder 20, the vertical position of the edge grinding member 13 may be varied to bring the desired portion thereof into service by turning the knob 37 in the appropriate direction to the desired extent.

I claim:

1. In a sole edge trimmer, a horizontal sole-supporting surface having a hole extending therethrough, a shaft having its axis at right angles to said surface and including an edge trimming member at its upper end in said hole and extending above said surface, a holder below said surface rotatably receiving and supporting the lower end of said shaft, and adjustable means below said surface supporting said holder and operable to move it and said shaft vertically relative to said surface into a selected and fixed operating position.

2. The sole edge trimmer of claim 1 in which the adjustable supporting means includes a transversely slidable support and adjustable means connected to the support operable to move the support and holder transversely as a unit.

3. The sole edge trimmer of claim 1 in which the axial extent of the edge trimming member is substantially greater than the thickness of a sole to be trimmed thereby to provide a plurality of annular portions each for trimming a sole edge.

4. The sole edge trimmer of claim 1 in which the edge trimming member includes a plurality of annular portions, each for trimming a sole edge.

5. The sole edge trimmer of claim 4 in which the annular portions are separate elements.

6. The sole edge trimmer of claim 2 and a drive for the shaft including a motor carried by the support.

7. The sole edge trimmer of claim 2 in which the support is a vertically disposed plate, the holder is attached to one side of the plate, the adjustable means for the plate are connected to the opposite side thereof, and a drive for the shaft includes a motor carried by said opposite side.

8. The sole edge trimmer of claim 1 in which the adjustable means includes a support in the form of a vertically disposed plate, a mount attached to one side of the plate slidably receives the holder, a slide slidably supported by and between the mount and the support, the slide having an inclined slot therein, the holder includes an arm slidably entrant of the slot, and an adjustable connection between the slide and the support operative to move the slide forwardly and rearwardly with respect thereto thereby to move the holder in a vertical direction.

9. The sole edge trimmer of claim 8 in which the support is slidable forwardly and rearwardly, and adjustable means connected thereto are operable to slide said support.

10. The sole edge trimmer of claim 9 and means to lock the holder to the shaft and means to lock the support against movement.

11. The sole edge trimmer of claim 10 in which the adjustable connection and the lock for the holder include telescoping sections.

12. The sole edge trimmer of claim 10 in which means locking the support against movement and the adjustable means that are connected to the support include concentric portions.

13. The sole edge trimmer of claim 12 in which the outer portion includes a plate-engaging cam which is the means for locking the support against movement.

References Cited

UNITED STATES PATENTS 3,235,894  2/1966  Dardig _____ 12—87

FOREIGN PATENTS 836,903  4/1952  Germany.

PATRICK D. LAWSON, *Primary Examiner.*